US010886805B2

(12) United States Patent
Takahashi et al.

(10) Patent No.: US 10,886,805 B2
(45) Date of Patent: Jan. 5, 2021

(54) STATOR FOR ROTARY ELECTRIC MACHINE

(71) Applicant: HONDA MOTOR CO., LTD., Tokyo (JP)

(72) Inventors: Tadanobu Takahashi, Saitama (JP); Yoshinori Tanaka, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 16/293,924

(22) Filed: Mar. 6, 2019

(65) Prior Publication Data

US 2019/0280547 A1    Sep. 12, 2019

(30) Foreign Application Priority Data

Mar. 8, 2018  (JP) ................................ 2018-042243

(51) Int. Cl.
| | |
|---|---|
| *H02K 3/24* | (2006.01) |
| *H02K 1/14* | (2006.01) |
| *H02K 9/19* | (2006.01) |
| *H02K 1/20* | (2006.01) |
| *H02K 9/22* | (2006.01) |
| *H02K 1/18* | (2006.01) |

(52) U.S. Cl.
CPC ............... *H02K 3/24* (2013.01); *H02K 1/146* (2013.01); *H02K 1/185* (2013.01); *H02K 1/20* (2013.01); *H02K 9/19* (2013.01); *H02K 9/22* (2013.01)

(58) Field of Classification Search
CPC ............ H02K 3/24; H02K 1/20; H02K 1/146; H02K 1/185; H02K 5/20; H02K 9/19; H02K 9/193; H02K 9/197

USPC .............................................. 310/54, 58, 59
See application file for complete search history.

(56) References Cited

U.S. PATENT DOCUMENTS

| | | | | |
|---|---|---|---|---|
| 3,675,056 A | * | 7/1972 | Lenz ...................... | H02K 9/20 |
| | | | | 310/54 |
| 2012/0286597 A1 | * | 11/2012 | Gundtoft ................. | H02K 3/24 |
| | | | | 310/59 |
| 2013/0264897 A1 | * | 10/2013 | Bradfield ................ | H02K 3/24 |
| | | | | 310/58 |
| 2018/0054097 A1 | * | 2/2018 | Dlala ..................... | H02K 15/024 |
| 2018/0123409 A1 | | 5/2018 | Rogginger et al. | |

FOREIGN PATENT DOCUMENTS

| | | |
|---|---|---|
| CN | 107431411 A | 12/2017 |
| JP | H10-248211 A | 9/1998 |
| JP | 2009-201216 A | 9/2009 |

OTHER PUBLICATIONS

Aug. 31, 2020, Chinese Office Action issued for related CN application No. 201910174677.X.

* cited by examiner

*Primary Examiner* — Michael Andrews
(74) *Attorney, Agent, or Firm* — Paratas Law Group, PLLC (57) ABSTRACT

A stator for a rotary electric machine includes: a stator core including an annular stator yoke, a plurality of teeth protruding from the stator yoke to an inside in a radial direction, and a plurality of slots formed between adjacent teeth; and a plurality of coils arranged in each of the slots. In the stator core, a coolant distributing plate having an annular shape to surround the plurality of coils from an outer circumferential side is interposed, and the coolant distributing plate is provided with coolant supply portions discharging a coolant toward the plurality of coils.

6 Claims, 7 Drawing Sheets

STATOR FOR ROTARY ELECTRIC MACHINE

CROSS-REFERENCE TO RELATED APPLICATIONS

This application is based on and claims priority under 35 USC 119 from Japanese Patent Application No. 2018-042243 filed on Mar. 8, 2018, the contents of which are incorporated herein by reference.

TECHNICAL FIELD

The present invention relates to a stator for a rotary electric machine to be mounted on an electric vehicle or the like.

BACKGROUND

A stator for a rotary electric machine includes a stator core and coils to be installed to the stator core. In order to increase the output of the rotary electric machine, it is necessary to cool the coils serving as a source of generating heat.

In the related art, as a cooling method of a rotary electric machine, a method is widely used in which cooling is performed by supplying a coolant such as water, oil, or the like to the outside of the stator core or to the coil end.

In addition, a method is also suggested in which a plate-shaped heat pipe is disposed in a coil bundle layer inserted into the slot, thereby cooling the inside of the slot through heat transport inside the heat pipe (refer to Japanese Patent Application Laid-Open Publication No. H10-248211).

However, the cooling efficiency inside the slot is not good in the method of performing cooling by supplying a coolant to the outside of the stator core or to the coil end.

In addition, the cooling method described in Japanese Patent Application Laid-Open Publication No, H10-248211 has a problem that the manufacturing process of the rotary electric machine becomes complicated in order to insert the heat pipe into the coil bundle layer, resulting in an increase in the manufacturing cost. Considering the size of the heat pipe to be capable of realizing the heat transporting function, the coil occupancy rate in the slot remarkably deteriorates.

The present invention provides a stator for a rotary electric machine in which coils arranged inside the slot can be cooled properly.

SUMMARY

A stator for a rotary electric machine related to the invention includes: a stator core including an annular stator yoke, a plurality of teeth protruding from the stator yoke to an inside in a radial direction, and a plurality of slots formed between adjacent teeth; and a plurality of coils arranged in each of the slots. In the stator core, a coolant distributing plate having an annular shape to surround the plurality of coils from an outer circumferential side is interposed, and the coolant distributing plate is provided with coolant supply portions discharging a coolant toward the plurality of coils.

According to the invention, the coolant distributing plate is interposed in the stator core, and thus it is possible to supply a coolant to the coils positioned inside the slot and the coils disposed inside the slot can be cooled properly.

DESCRIPTION OF EMBODIMENTS

Hereinafter, a stator 10 for a rotary electric machine according to an embodiment will be described with reference to FIGS. 1 to 7.

Figure 1:
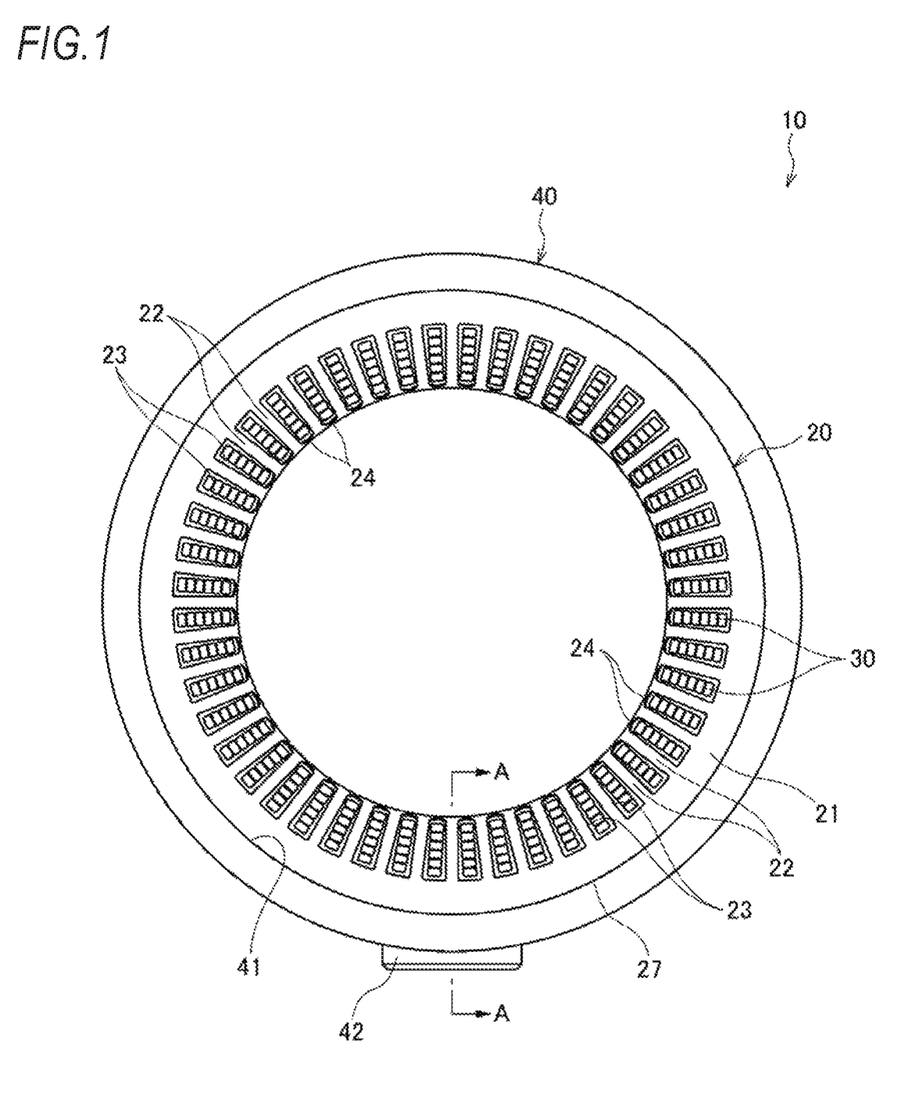
FIG. 1 is a front view illustrating a stator for a rotary electric machine according to an embodiment of the present invention.
Figure 2:
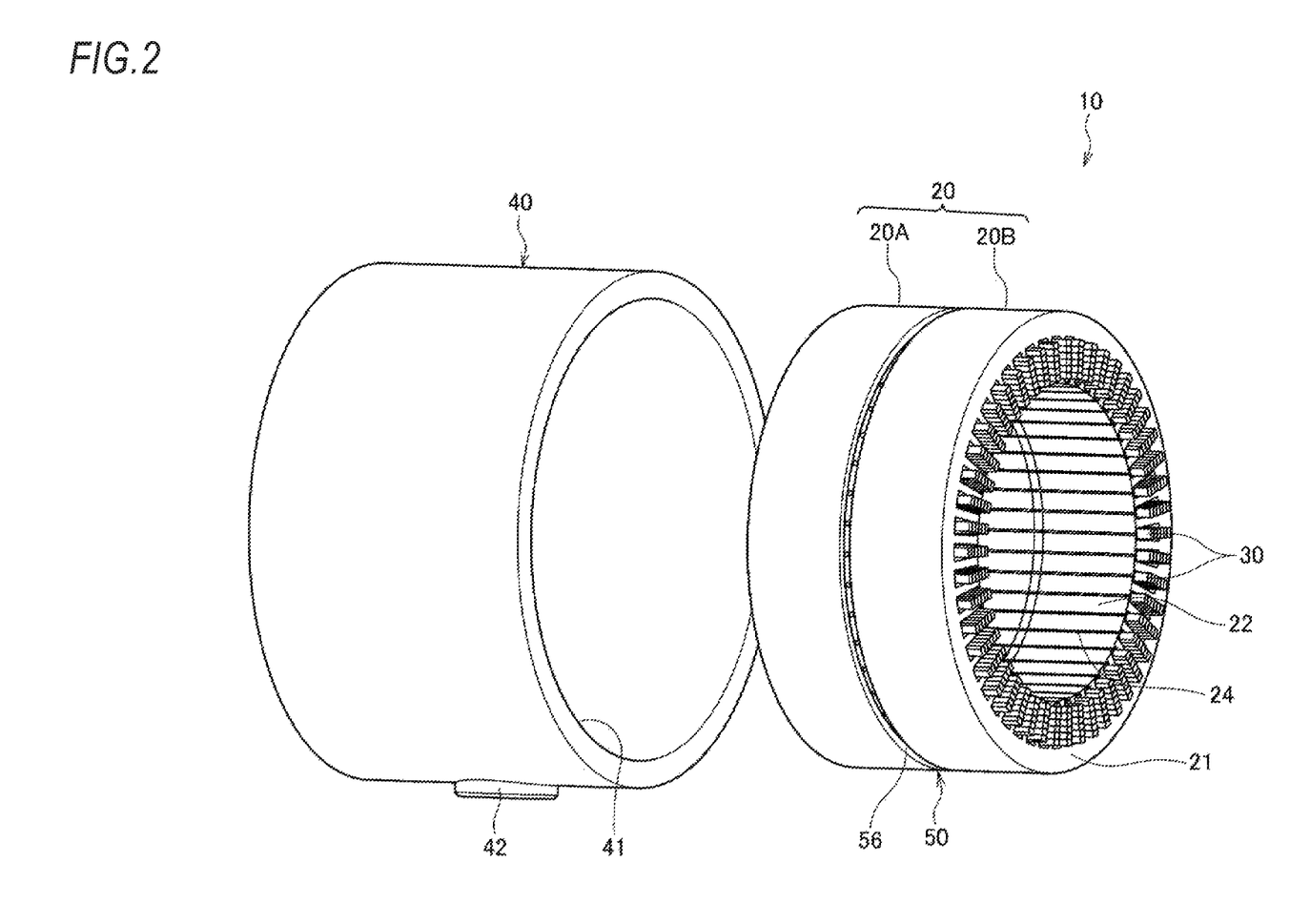
FIG. 2 is an exploded perspective view illustrating the stator for a rotary electric machine illustrated in FIG. 1.

As illustrated in FIGS. 1 and 2, the stator 10 for a rotary electric machine includes a stator core 20, coils 30, a case 40 holding the stator core 20, and a coolant distributing plate 50 interposed in the stator core 20.

The stator core 20 includes a pair of stator core portions 20A and 20B which are formed by laminating a plurality of electromagnetic steel sheets. The axial lengths (lamination thicknesses) of the pair of stator core portions 20A and 20B are set to be substantially the same. Each of the pair of stator core portions 20A and 20B is formed by laminating a plurality of electromagnetic steel sheets having the same shape and includes a stator yoke 21 formed in an annular shape, a plurality of teeth 22 protruding from the stator yoke 21 toward an inside in a radial direction, and a plurality of slots 23 formed between the adjacent teeth 22. The stator core 20 is subjected to insulation treatment, thereby securing insulating properties.

Figure 5:
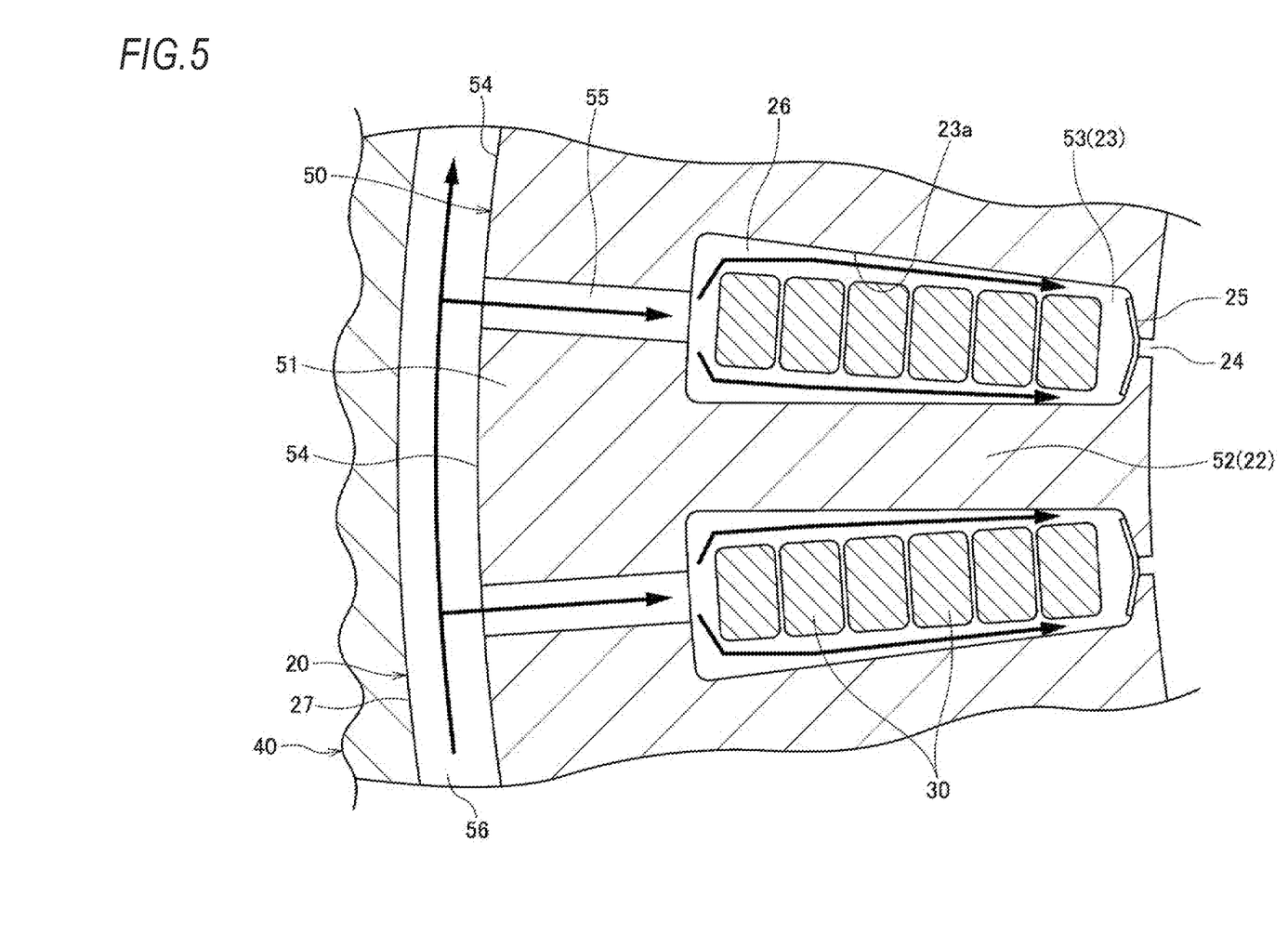
FIG. 5 is an explanation view illustrating the flow of a coolant inside the coolant distributing plate.
Figure 6:
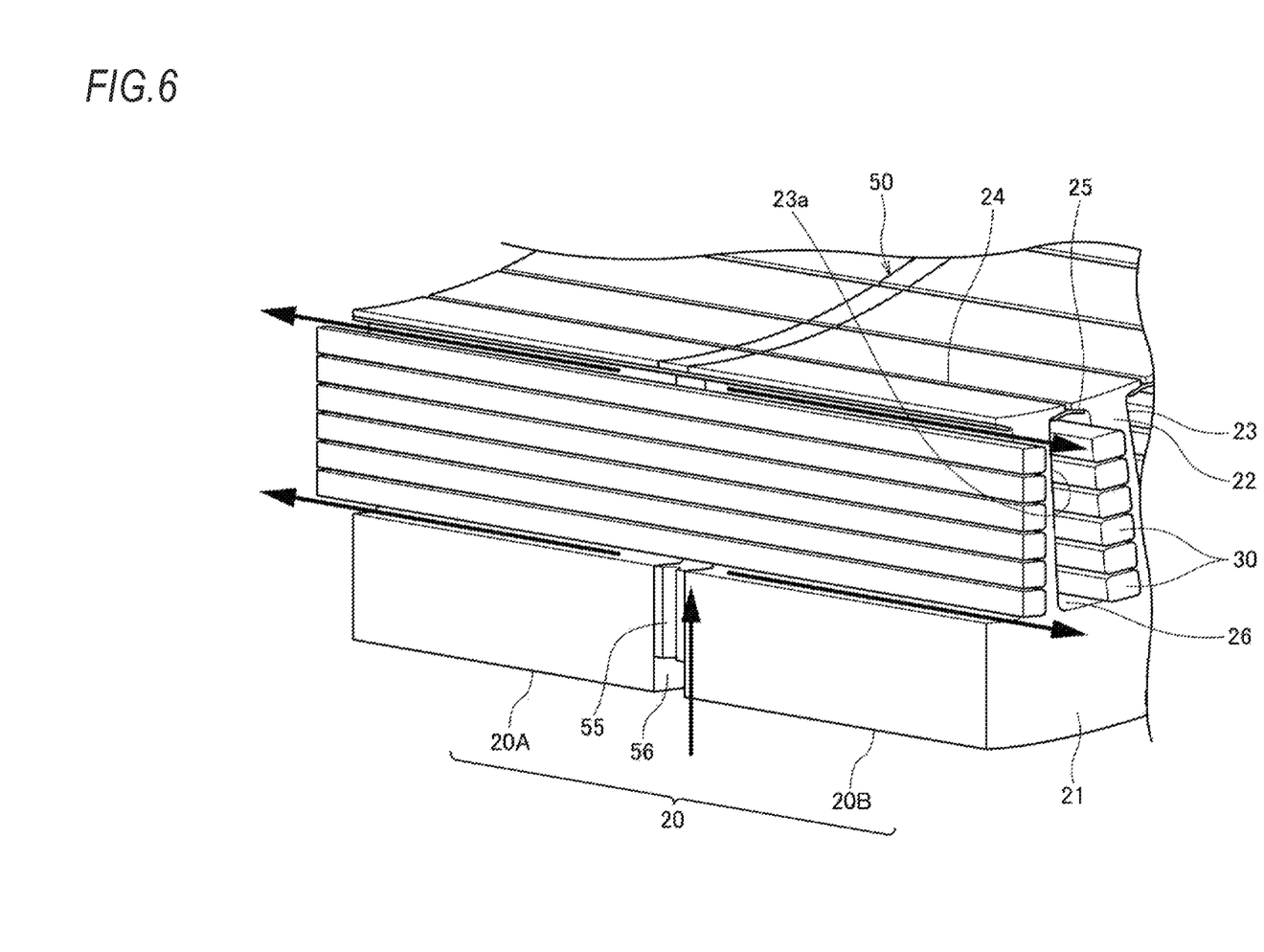
FIG. 6 is an explanation view illustrating the flow of the coolant flowing to the coils inside the slot from a coolant supply portion of the coolant distributing plate.

With reference to FIGS. 5 and 6, each slot 23 includes an opening 24 which opens to the inner circumferential surface of the stator core 20. In each opening 24, a sealing member 25 is provided to seal the opening 24. The sealing member 25 prevents a coolant supplied to the inside of the slot 23 from being discharged from the opening 24 to a gap between a rotor (not illustrated) and the stator core 20, thereby cooling the inside of the slot 23 effectively. In a case where the slot 23 is a closed slot without the opening 24, the installation of the sealing member 25 can be omitted.

In the plurality of slots 23, coils 30 are inserted respectively. The plurality of coils 30 inserted into each slot 23 may be adhered to each other with an adhesive layer, and further the coils 30 adhered to each other may be fixed to the sealing member 25. As illustrated in FIG. 5, a slot inner flow path 26 is formed to penetrate in an axial direction between the inner wall surface 23a of the slot 23 and the coils 30. The coil 30 in this embodiment is formed of a segment coil, but may be formed by winding a conducting wire having a circular cross section. Although the coil end of the coil 30 in this embodiment is not illustrated, the coil ends of the same phase are adhered to each other, thereby forming a coil loop of plural phases.

Returning to FIG. 2, the case 40 is formed to be an annular shape, and the stator core 20 (the stator core portions 20A and 20B) in which a coolant distributing plate 50 is interposed at the axial center portion thereof is fixed to the inner circumferential surface 41 of the case 40. The case 40 includes a projection portion 42 at which a part of the case protrudes to an outside in the radial direction on the outer circumferential surface at the axial center portion. The projection portion 42 is provided with a coolant inlet 43 for introducing a coolant supplied from a coolant pump (not illustrated) (refer to FIG. 7).

Figure 3:
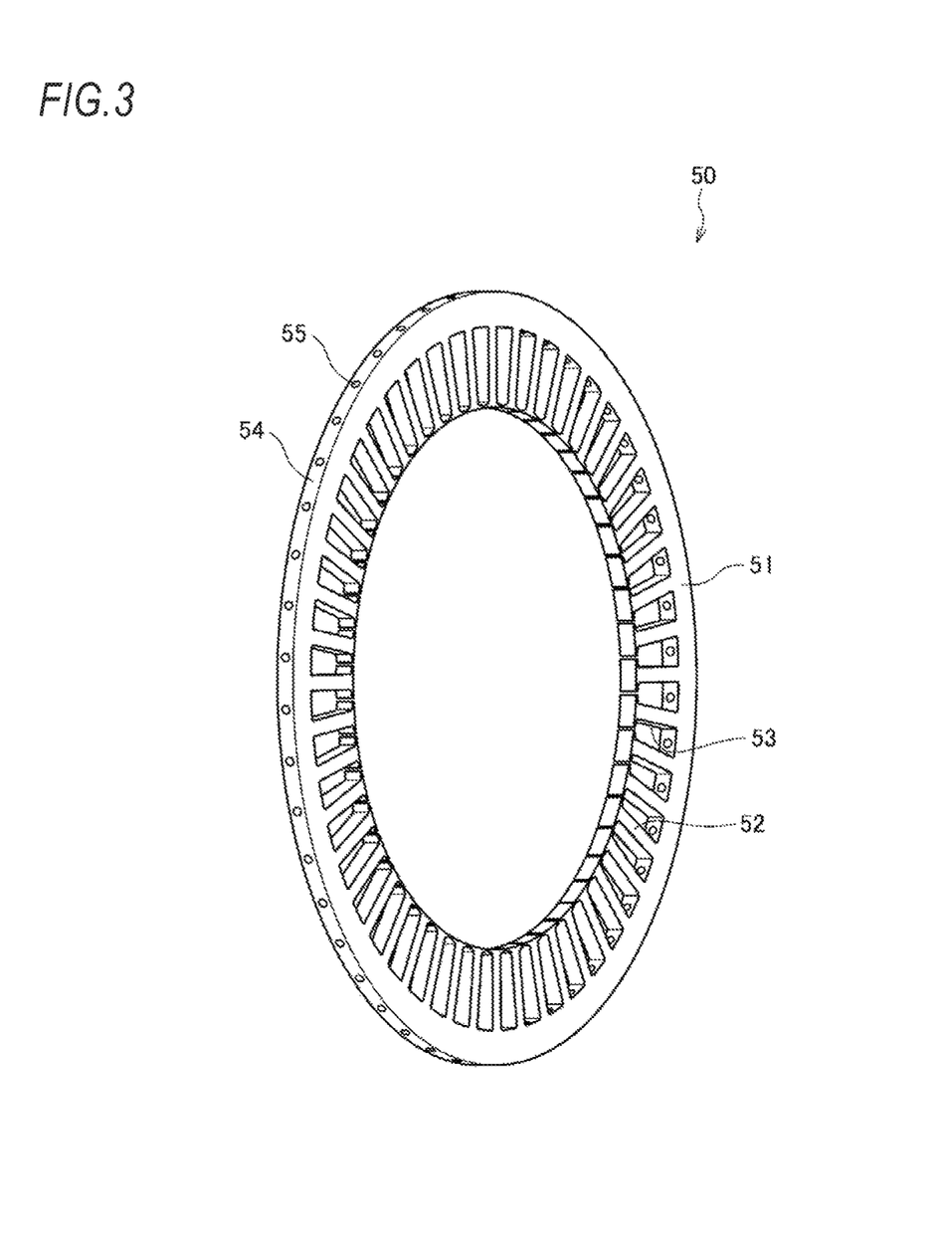
FIG. 3 is a perspective view illustrating a coolant distributing plate.
Figure 4:
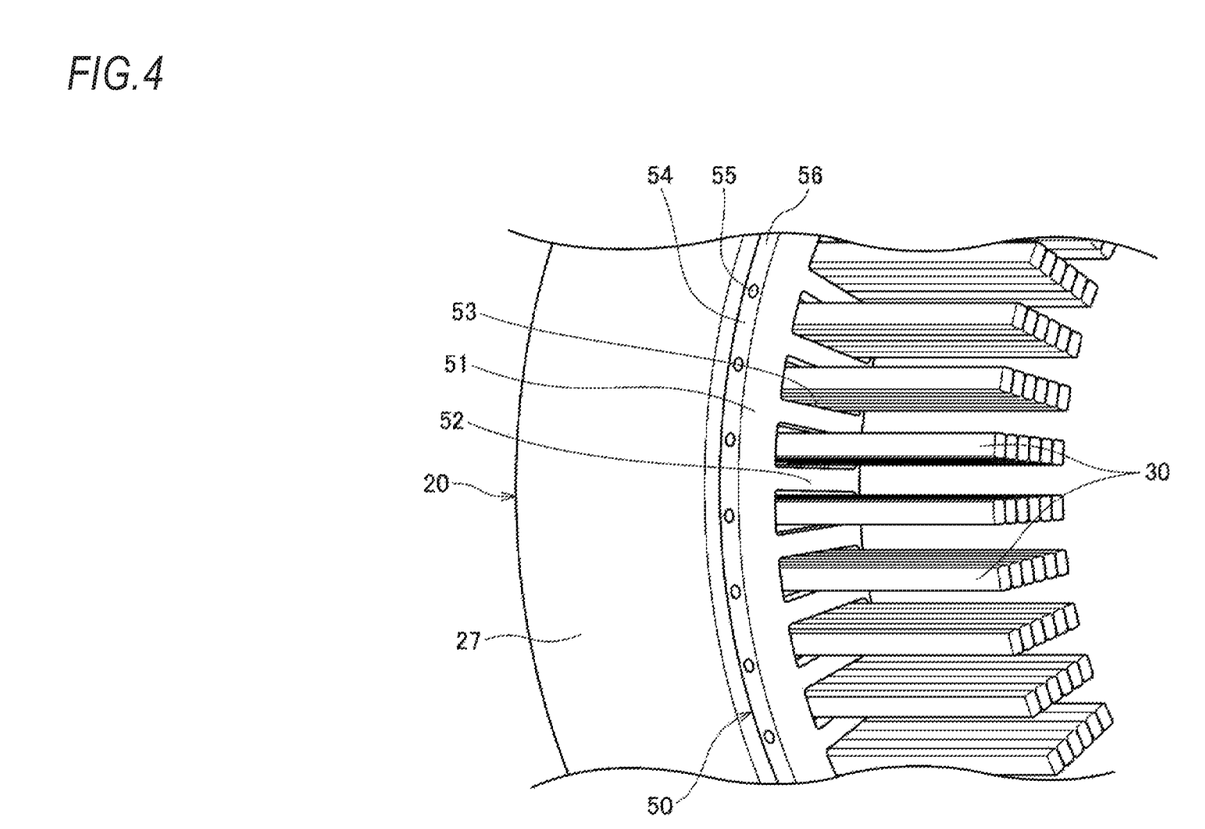
FIG. 4 is an enlarged perspective view of a main part of the stator for a rotary electric machine illustrating one stator core and a case removed.

As illustrated in FIGS. 3 and 4, the coolant distributing plate 50 is an annular plate-shaped member made of an insulating material and is interposed between the pair of stator core portions 20A and 20B at the axial center portion, Since the coolant distributing plate 50 is made of an insulating material, it is ensured that the coolant distributing plate 50 is insulated from the coils 30.

The coolant distributing plate 50 includes a plate annular portion 51, a plurality of plate teeth 52 protruding from the plate annular portion 51 to an inside in the radial direction, and a plurality of plate slots 53 formed between the adjacent plate teeth 52.

The plate annular portion 51 is formed to have the substantially same shape as the stator yoke 21 of the stator core 20, the plate teeth 52 are formed to have the substantially same shape as the teeth 22 of the stator core 20, and the plate slot 53 is formed to have the substantially same shape as the slot 23 of the stator core 20.

The plate annular portion 51 is formed with a coolant supply portion 55 extending to the radial direction in communication with the outer circumferential surface 54 of the coolant distributing plate 50 and each plate slot 53. The outer diameter of the outer circumferential surface 54 of the coolant distributing plate 50 is set to be smaller than the outer diameter of the outer circumferential surface 27 of the stator core 20.

The coolant distributing plate 50 is interposed between the pair of stator core portions 20A and 20B by aligning the phases of the plurality of plate teeth 52 of the coolant distributing plate 50 with the plurality of teeth 22 of the stator core 20 in a circumferential direction, in other words, by matching the phases of the plurality of plate slots 53 of the coolant distributing plate 50 and the plurality of slots 23 of the stator core 20 in the circumferential direction.

The coils 30 are inserted into the plurality of slots 23 of the stator core 20 and the plurality of plate slots 53 of the coolant distributing plate 50. In other words, the stator core 20 and the coolant distributing plate 50 are arranged such that the stator yoke 21 and the plate annular portion 51 surround the coils 30 from the outer circumferential side in a state where the coils 30 are accommodated in the slots 23 and the plate slots 53.

As illustrated in FIGS. 5 and 6, the case 40 is externally fitted to the outer circumferential surface 27 of the stator core 20 to be assembled. Since the outer diameter of the outer circumferential surface 54 of the coolant distributing plate 50 is set to be smaller than the outer diameter of the outer circumferential surface 27 of the stator core 20, the outer circumferential surface of the stator core 20 is fixed to the inner circumferential surface 41 of the case 40, so that an annular coolant introduction path 56 is formed between the inner circumferential surface 41 of the case 40 and the outer circumferential surface 54 of the coolant distributing plate 50. The annular coolant introduction path 56 communicates with the coolant supply portion 55 of the coolant distributing plate 50 and the coolant inlet 43 of the case 40.

As illustrated by an arrow in FIGS. 5 and 6, a coolant supplied to the coolant inlet 43 of the case 40 from a coolant pump (not illustrated) flows in the annular coolant introduction path 56 provided between the inner circumferential surface 41 of the case 40 and the outer circumferential surface 54 of the coolant distributing plate 50 along the circumferential direction, is discharged to be divided on the left and right sides in the slot inner flow path 26, which is a gap between the slot 23 and the coils 30, through the plurality of coolant supply portions 55 of the coolant distributing plate 50, and further flows inside the slot inner flow path 26 along the axial direction to cool the coils 30 directly. The coolant used to cool the coils 30 flows out from the left and right ends of the slot 23 to cool the coil ends (not illustrated) of the coils 30.

As described above, the coolant is supplied to each slot inner flow path 26 of the pair of stator core portions 20A and 20B from the axial center portion of the stator core 20 in which the temperature easily increases through the coolant distributing plate 50 and flows on the left and right sides along the axial direction inside the slot inner flow path 26 to cool the coils 30 directly. As a result, the coils 30 inside the slot 23 can be cooled over the entire axial direction efficiently and uniformly without temperature fluctuation. Accordingly, it is possible to increase the allowable currents, thereby improving torque.

Figure 7:
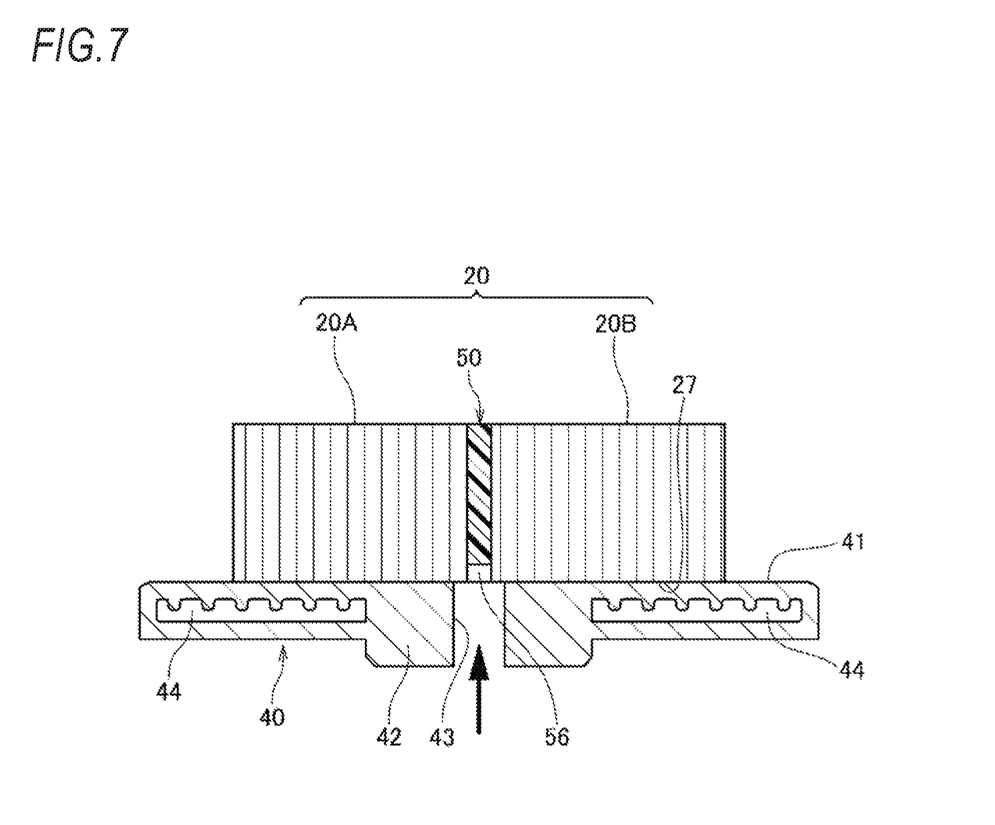
FIG. 7 is a cross sectional view taken along the line A-A of FIG. 1.

Further, the case 40 can be formed in a hollow annular shape, and a water jacket 44 can be provided inside the case 40 as illustrated in FIG. 7.

The case 40 including the water jacket 44 is externally fitted to the stator core 20, and thus the coolant to be supplied to the slot inner flow path 26 through the coolant distributing plate 50 can cool the coils 30 directly and the stator core 20 can be cooled from also the outer circumferential surface by the water jacket 44, thereby performing cooling effectively.

The above-described embodiment can be modified, improved, and the like as appropriate. For example, the coolant distributing plate 50 is disposed at the axial center of the stator core 20 in the above-described embodiment. However, the disposition is not limited to the axial center, and the coolant distributing plate can be disposed on any one side surface of the stator core 20, for example. In this case, the stator core portions 20A and 20B of the stator core 20 are integrally formed. In addition, the amount of the coolant to be supplied may be appropriately changed according to the heating value of the coils 30.

At least the following matters are described in this specification. Although the corresponding constituent elements and the like in the above embodiment are shown in the parenthesis, the present invention is not limited thereto.

(1) A stator (a stator 10 for a rotary electric machine) for a rotary electric machine including:

a stator core (a stator core 20) including an annular stator yoke (a stator yoke 21), a plurality of teeth (teeth 22) protruding from the stator yoke to an inside in a radial direction, and a plurality of slots (slots 23) formed between adjacent teeth; and a plurality of coils (coils 30) arranged in each of the slots, wherein in the stator core, a coolant distributing plate (a coolant distributing plate 50) having an annular shape to surround the plurality of coils from an outer circumferential side is interposed, and the coolant distributing plate is provided with coolant supply portions (coolant supply portions 55) discharging a coolant toward the plurality of coils.

According to (1), the coolant distributing plate is interposed in the stator core, and thus it is possible to supply a coolant to the coils positioned inside the slot and it is possible to properly cool the coils disposed inside the slot.

(2) The stator for the rotary electric machine according to (1), wherein between an inner wall surface (an inner wall surface 23a) of each slot and the plurality of coils, a slot inner flow path (a slot inner flow path 26) is provided to guide the coolant supplied to each slot from the coolant supply portion along the plurality of coils in an axial direction.

According to (2), it is possible to cool the coils inside the slot over the entire axial direction.

(3) The stator for the rotary electric machine according to (2), wherein the stator core is formed with an opening (an opening 24) of each slot on an inner circumferential surface thereof, and each of the slots is provided with a sealing member (a sealing member 25) sealing the opening.

According to (3), since each slot is provided with the sealing member sealing the opening, it is possible to prevent the coolant supplied to the inside the slot from being discharged from the opening.

(4) The stator for the rotary electric machine according to (2) or (3), wherein the coil is formed of a segment coil, each of the slots is disposed with a plurality of the segment coils, and the plurality of segment coils are adhered to each other with an adhesive layer adhesive layer)

According to (4), since the plurality of segment coils adhered to each other with the adhesive layer are disposed in each slot, it is possible to easily form the slot inner flow path between the inner wall surface of the slot and the coils.

(5) The stator for the rotary electric machine according to any one of (1) to (4), wherein the coolant distributing plate is disposed at an axial center portion of the stator core.

According to (5), since the coolant distributing plate is disposed at the axial center portion of the stator core, it is possible to actively supply a coolant to the axial center portion of the stator core where the temperature easily becomes the highest temperature.

(6) The stator for the rotary electric machine according to any one of (1) to (5), wherein the stator core is fixed to an inner circumferential surface (an inner circumferential surface 41) of a case (a case 40), between an outer circumferential surface (an outer circumferential surface 54) of the coolant distributing plate and the inner circumferential surface of the case, an annular coolant introduction path (a coolant introduction path 56) is provided, and the case is provided with a coolant inlet (a coolant inlet 43) communicating with the coolant introduction path.

According to (6), since the annular coolant introduction path is provided between the outer circumferential surface of the coolant distributing plate and the inner circumferential surface of the case holding the stator core, it is possible to supply the coolant introduced from the coolant inlet to the coolant distributing plate over the entire circumference without being provided with a pipe or the like.

(8) The stator for the rotary electric machine according to (6), wherein the case is formed with a water jacket (a water jacket 44) inside.

According to (8), it is possible to cool the coils through the coolant distributing plate and the stator core can be cooled by the water jacket.

(8) The stator for the rotary electric machine according to any one of (1) to (8), wherein the coolant distributing plate includes a plate annular portion (a plate annular portion 51) having the substantially same shape as the stator yoke of the stator core, a plurality of plate teeth (plate teeth 52) protruding from the plate annular portion to the inside in the radial direction and having the substantially same shape as the plurality of teeth of the stator core, and a plurality of plate slats (plate slots 53) formed between adjacent plate teeth and having the substantially same shape as the plurality of slots of the stator core, and the coolant supply portion is a hole portion communicating from an outer circumferential surface of the plate annular portion to the plate slot.

According to (8), since the coolant distributing plate has the substantially same shape as the stator core, the installation of the coils and the like becomes facilitated.

What is claimed is:

1. A stator for a rotary electric machine comprising:
a stator core including an annular stator yoke, a plurality of teeth protruding from the stator yoke to an inside in a radial direction, and a plurality of slots formed between adjacent teeth; and
a plurality of coils arranged in each of the slots, wherein
in the stator core, a coolant distributing plate having an annular shape to surround the plurality of coils from an outer circumferential side is interposed,
the coolant distributing plate is provided with coolant supply portions discharging a coolant toward the plurality of coils,
between an inner wall surface of each slot and the plurality of coils, a slot inner flow path is provided to guide the coolant supplied to each slot from the coolant supply portion along the plurality of coils in an axial direction,
the stator core is formed with an opening of each slot on an inner circumferential surface thereof,
each of the slots is provided with a sealing member sealing the opening,
the coolant flows from a coil provided on an outermost side of the plurality of coils toward a coil provided on an innermost side of the plurality of coils,
the coolant flows in the axial direction between the opening of each of the slots and the coil provided on the innermost side of the plurality of coils, and
the coolant flows through respective spaces that are bounded by inner wall surfaces of the slots and respective sealing members.

2. The stator for the rotary electric machine according to claim 1, wherein
the coil is formed of a segment coil,
each of the slot is disposed with a plurality of the segment coils, and
the plurality of segment coils are adhered to each other with an adhesive layer.

3. The stator for the rotary electric machine according to claim 1, wherein
the coolant distributing plate is disposed at an axial center portion of the stator core.

4. The stator for the rotary electric machine according to claim 1, wherein
the stator core is fixed to an inner circumferential surface of a case, between an outer circumferential surface of the coolant distributing plate and the inner circumferential surface of the case, an annular coolant introduction path is provided, and the case is provided with a coolant inlet communicating with the coolant introduction path.

5. The stator for the rotary electric machine according to claim 4, wherein the case is formed with a water jacket inside.

6. The stator for the rotary electric machine according to claim 1, wherein the coolant distributing plate includes
- a plate annular portion having the substantially same shape as the stator yoke of the stator core,
- a plurality of plate teeth protruding from the plate annular portion to the inside in the radial direction and having the substantially same shape as the plurality of teeth of the stator core, and
- a plurality of plate slots formed between adjacent plate teeth and having the substantially same shape as the plurality of slots of the stator core, and the coolant supply portion is a hole portion communicating from an outer circumferential surface of the plate annular portion to the plate slot.

\* \* \* \* \*